US012439006B2

(12) United States Patent
Aokage et al.

(10) Patent No.: US 12,439,006 B2
(45) Date of Patent: Oct. 7, 2025

(54) INFORMATION PROCESSING DEVICE, USER TERMINAL, INFORMATION PROCESSING METHOD, AND STORAGE MEDIUM

(71) Applicant: TOYOTA JIDOSHA KABUSHIKI KAISHA, Toyota (JP)

(72) Inventors: Hironori Aokage, Nagoya (JP); Tatsuya Maemura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/403,113

(22) Filed: Jan. 3, 2024

(65) Prior Publication Data

US 2024/0297966 A1   Sep. 5, 2024

(30) Foreign Application Priority Data

Mar. 3, 2023   (JP) .................................. 2023-033065

(51) Int. Cl.
 *H04N 7/18*   (2006.01)
(52) U.S. Cl.
 CPC ............. *H04N 7/185* (2013.01); *H04N 7/188* (2013.01)

(58) Field of Classification Search
 CPC ............................... H04N 7/185; H04N 7/188
 See application file for complete search history.

(56) References Cited

FOREIGN PATENT DOCUMENTS

JP    2018-016138 A    2/2018

*Primary Examiner* — Mathew Franklin Gordon
(74) *Attorney, Agent, or Firm* — Sughrue Mion, PLLC

(57) ABSTRACT

An information processing device mounted on a vehicle includes a control unit configured to, when a travel system of the vehicle is not activated, record first video data in a predetermined storage device when a first event has occurred in the vehicle, the first video data being video data captured by an in-vehicle camera of the vehicle and obtained when the first event has occurred, and transmit first information that indicates occurrence of the first event to a user terminal possessed by a user, and record second video data in the storage device when a second event of a different type from the first event has occurred without transmitting information that indicates occurrence of the second event to the user terminal, the second video data being video data captured by the in-vehicle camera and obtained when the second event has occurred.

19 Claims, 8 Drawing Sheets

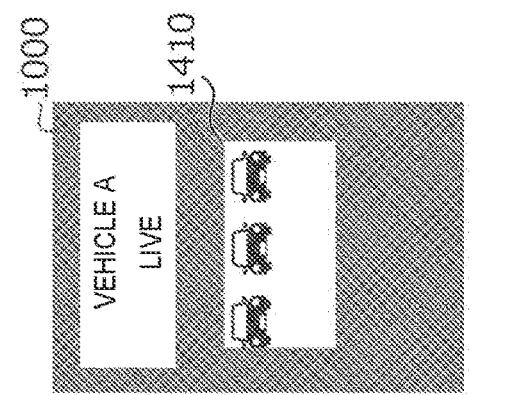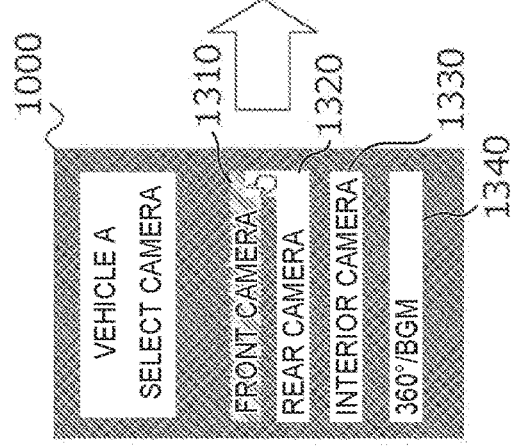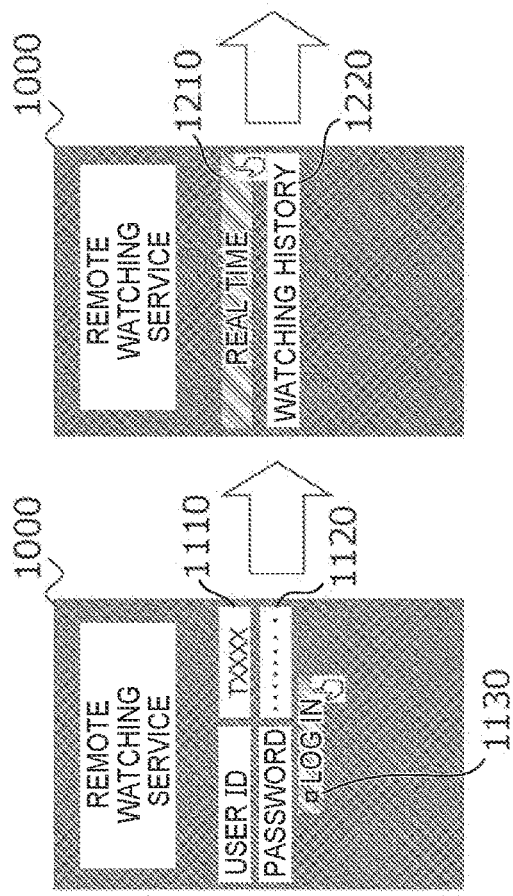
FIG. 5A  FIG. 5B  FIG. 5C  FIG. 5D

INFORMATION PROCESSING DEVICE, USER TERMINAL, INFORMATION PROCESSING METHOD, AND STORAGE MEDIUM

CROSS-REFERENCE TO RELATED APPLICATION

This application claims priority to Japanese Patent Application No. 2023-033065 filed on Mar. 3, 2023 incorporated herein by reference in its entirety.

BACKGROUND

1. Technical Field

The present disclosure relates to vehicle monitoring.

2. Description of Related Art

There is a known technique in which a user operates a device that monitors a vehicle using a predetermined apparatus possessed by the user when the vehicle is parked to cause the device to notify the apparatus of the state of the vehicle. In this regard, Japanese Unexamined Patent Application Publication No. 2018-16138 (JP 2018-16138 A) discloses a unit that allows a user terminal possessed by a user to select one of a plurality of monitoring functions of a vehicle when the vehicle is not traveling, and that notifies the user terminal of the results of monitoring, for example.

SUMMARY

The present disclosure provides an information processing device, a user terminal, an information processing method, and a storage medium that reduce unnecessary notifications sent to a user terminal when monitoring a vehicle.

An aspect of the present disclosure provides an information processing device mounted on a vehicle, including a control unit configured to, when a travel system of the vehicle is not activated, record first video data in a predetermined storage device when a first event has occurred in the vehicle, the first video data being video data captured by an in-vehicle camera of the vehicle and obtained when the first event has occurred, and transmit first information that indicates occurrence of the first event to a user terminal possessed by a user, and record second video data in the storage device when a second event of a different type from the first event has occurred without transmitting information that indicates occurrence of the second event to the user terminal, the second video data being video data captured by the in-vehicle camera and obtained when the second event has occurred.

An aspect of the present disclosure provides a user terminal including a control unit configured to, when a travel system of a vehicle is not activated, receive information indicating that a first event or a second event of a different type from the first event has occurred in the vehicle: and notify a user of occurrence of the first event via a predetermined interface when the information indicates that the first event has occurred in the vehicle.

An aspect of the present disclosure provides a program that causes a computer to execute processes including: when a travel system of a vehicle is not activated, receiving information indicating that a first event or a second event of a different type from the first event has occurred in the vehicle: and notifying a user of occurrence of the first event via a predetermined interface when the information indicates that the first event has occurred in the vehicle.

An aspect of the present disclosure provides an information processing method executed by an information processing device mounted on a vehicle, including, when a travel system of the vehicle is not activated, recording first video data in a predetermined storage device when a first event has occurred in the vehicle, the first video data being video data captured by an in-vehicle camera of the vehicle and obtained when the first event has occurred, and transmitting first information that indicates occurrence of the first event to a user terminal, and recording second video data in the storage device when a second event of a different type from the first event has occurred without transmitting information that indicates occurrence of the second event to the user terminal, the second video data being video data captured by the in-vehicle camera and obtained when the second event has occurred.

Other aspects provide a method executed by the above device, a program that causes a computer to execute the method, and a computer-readable storage medium that stores the program in a non-transitory manner.

According to the present disclosure, it is possible to reduce unnecessary notifications sent to a user terminal when monitoring a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is an example of a screen displayed by the user terminal;

FIG. 5B is an example of a screen displayed by the user terminal:

FIG. 5C is an example of a screen displayed by the user terminal;

FIG. 5D is an example of a screen displayed by the user terminal;

DETAILED DESCRIPTION OF EMBODIMENTS

Figure 1:
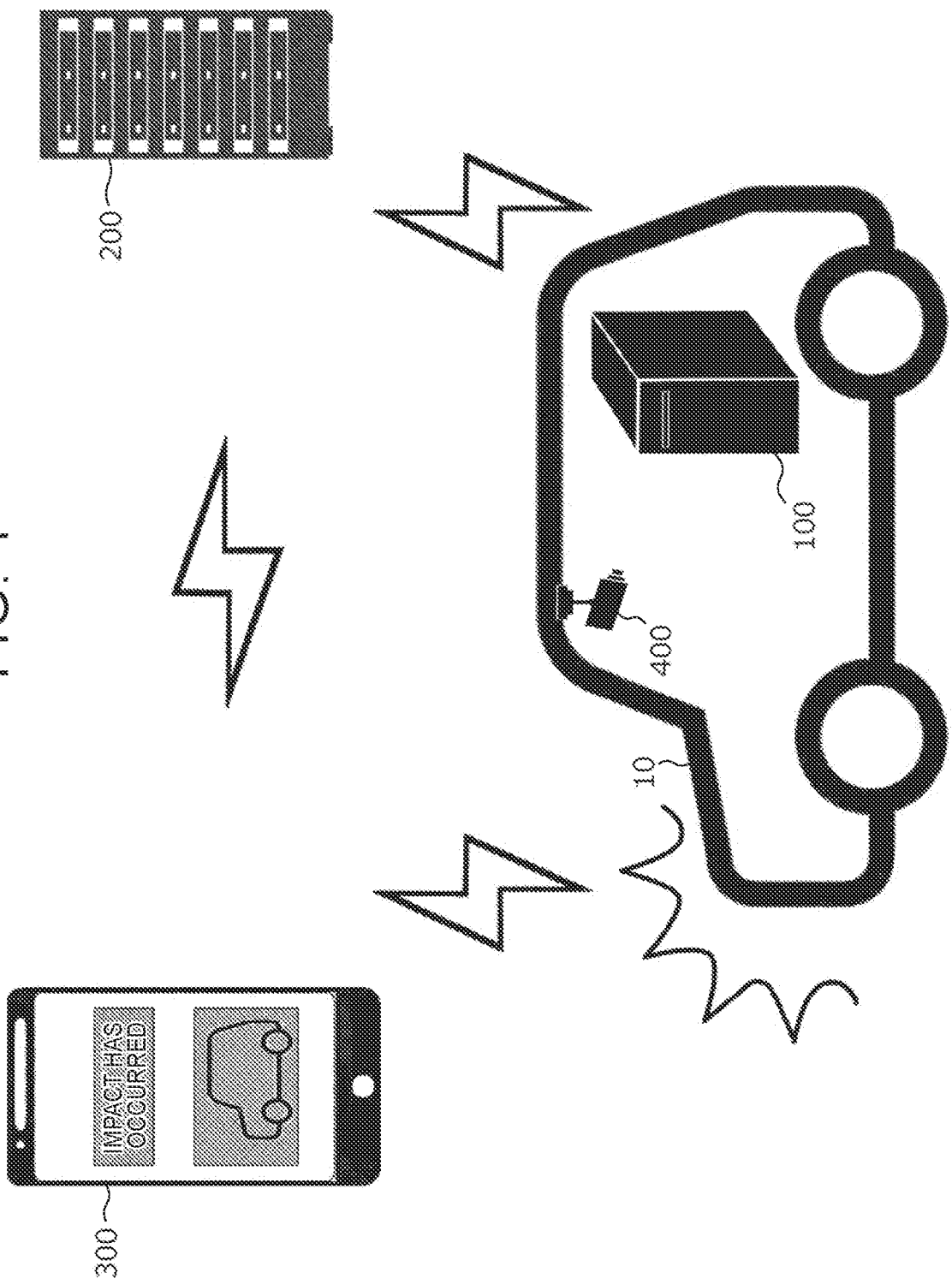
FIG. 1 is a conceptual diagram of an information processing device according to a first embodiment.

There is known an information processing device mounted on a vehicle to monitor the vehicle while the vehicle is parked and notify a user terminal possessed by a user (hereinafter "user terminal") of the results of monitoring.

In the information processing device according to the related art, however, appropriate consideration is not given to a method of notifying a user of detection results upon detecting events that are less urgent and that occur highly frequently.

When events that are less urgent are detected while monitoring a vehicle, the user is preferably not frequently notified of the occurrence of such events.

For example, a person approaching the vehicle etc. is occasionally detected, in order to prevent a theft or an intrusion. If a notification is transmitted using detection of a person as a trigger, however, a notification is transmitted each time a person passes around the vehicle or a person gets on and off an adjacent vehicle, which reduces usability. However, it is not preferable to avoid detecting events that are less urgent. This is because the user may need to check video later to see what events have occurred, even if the events are less urgent.

In order to address this issue, it is requested to selectively issue notifications for the user and record video according to the type of the events that have occurred.

The information processing device according to the present disclosure addresses such an issue.

An aspect of the present disclosure provides an information processing device mounted on a vehicle, including a control unit configured to, when a travel system of the vehicle is not activated, record first video data in a predetermined storage device when a first event has occurred in the vehicle, the first video data being video data captured by an in-vehicle camera of the vehicle and obtained when the first event has occurred, and transmit first information that indicates occurrence of the first event to a user terminal possessed by a user, and record second video data in the storage device when a second event of a different type from the first event has occurred without transmitting information that indicates occurrence of the second event to the user terminal, the second video data being video data captured by the in-vehicle camera and obtained when the second event has occurred.

The first event is an event in which the vehicle may be damaged and which occurs when an impact on the vehicle is detected, an intrusion into the vehicle is detected, etc., for example. Specifically, the control unit can determine that a first event has occurred when an in-vehicle camera mounted on the vehicle or various sensors such as a shock sensor or an inclination sensor has detected an impact, a vehicle door being forced open, etc. The first event is not limited to an event that occurs when an impact on the vehicle is detected, when an event such as an intrusion into the vehicle is detected, etc. The first event may be any event that occurs when an event in which the vehicle may be damaged is detected.

The second event is an event that is not associated with directly damaging the vehicle and that occurs when an event such as approach by any person to the vehicle is detected, for example. Specifically, the control unit can determine that a second event has occurred when an in-vehicle camera mounted on the vehicle or various sensors such as a human sensor has detected that a person is present at a location within a predetermined distance from the vehicle. The second event is of a different type from the first event. The second event is not limited to an event that occurs when an event such as approach of any person to the vehicle is detected etc. The second event may be any event that occurs when an event that is not associated with directly damaging the vehicle is detected. The types of the first event and the second event may be determined in advance.

The first video data are video data captured by an in-vehicle camera of the vehicle and obtained when a first event has occurred. The first video data may be movie data, or may be one or more still image data. The first video data may be movie data to be transmitted by streaming. The first video data may be an image captured by a camera other than the in-vehicle camera as long as the image allows checking the interior or the vicinity of the vehicle.

The second video data are video data captured by an in-vehicle camera of the vehicle and obtained when a second event has occurred. The second video data may be movie data, or may be one or more still image data. The second video data may be movie data to be transmitted by streaming. The second video data may be an image captured by a camera other than the in-vehicle camera as long as the image allows checking the interior or the vicinity of the vehicle.

The first information is information that indicates the occurrence of a first event and that is to be transmitted from the information processing device to the user terminal. Examples of the first information include a flag that is set when a first event has occurred. The first information may be information that causes the user terminal to indicate the occurrence of a first event. The information processing device may transmit the first information to a predetermined external storage device.

The control unit stores the first video data or the second video data in the predetermined storage device when a first event or a second event has occurred. That is, the control unit writes the first video data or the second video data into a memory of the predetermined storage device. In other words, the control unit stores the first video data or the second video data in the predetermined storage device. Here, the predetermined storage device may be a storage unit of the information processing device, or may be an external server wirelessly connected to the vehicle.

The control unit transmits the first information to the user terminal when a first event has occurred. That is, the control unit notifies the user terminal of the occurrence of a first event. Alternatively, the control unit may instruct the user terminal to notify the user of the occurrence of a first event via a predetermined interface.

The control unit switches whether to transmit information (i.e. information that notifies the user) to the user terminal between when a first event has occurred and when a second event has occurred. Specifically, the control unit transmits the information to the user terminal when a first event has occurred, and does not transmit the information to the user terminal when a second event has occurred.

The control unit may be configured to, when the travel system of the vehicle is not activated, copy the second video data recorded in the first storage device and obtained when the second event has occurred to the external server device when the first event has occurred within a predetermined time since the occurrence of the second event.

The control unit may be configured to: determine times of the occurrence of the first event and the second event: and measure an elapsed time between the times of the occurrence of the first event and the second event.

The control unit may be configured to switch whether to transmit the second information to the user terminal according to the duration of the second event. For example, the control unit may be configured to transmit the second information to the user terminal when the length of the period for which the second event is continuously occurring becomes a predetermined threshold or more, and not to transmit the second information when the duration of the second event is less than the predetermined time.

The control unit may be configured to measure a length of a period for which the second event is repeatedly occurring at predetermined intervals or less as the length of the period for which the second event is continuously occurring.

This is because it is occasionally better to notify the user when the duration of the second event is long, although the second event is considered to be less urgent than the first event.

The control unit may record the second video data in the server device when the first event has occurred within a predetermined time since the occurrence of the second event.

With such a configuration, it is possible to reduce unnecessary notifications sent to a user terminal when monitoring a vehicle.

Specific embodiments of the present disclosure will be described below with reference to the drawings. The hardware configuration, the module configuration, the functional configuration, etc. described in relation to the embodiments are not intended to limit the technical scope of the disclosure to only such embodiments unless specifically stated otherwise.

First Embodiment

An overview of an information processing device according to a first embodiment will be described with reference to FIG. 1. FIG. 1 is a conceptual diagram of a system including an information processing device 100 according to the first embodiment.

A vehicle 10 includes the information processing device 100. The information processing device 100 acquires data transmitted from an in-vehicle camera 400, a sensor 500, etc. mounted on the vehicle 10, and determines whether a person approaching the vehicle 10, an impact on the vehicle 10, an intrusion into the vehicle 10, etc. has been detected.

A user terminal 300 is an information terminal possessed by a user that uses a service provided by the information processing device 100. The user terminal 300 may be an apparatus such as a smartphone or a tablet, for example. In the present embodiment, the user terminal 300 is notified of the results of determinations by the information processing device 100.

The server 200 is a server device that saves video captured by the in-vehicle camera 400.

There is a system in which a device mounted on a vehicle sends notifications to a user terminal when an impact on the vehicle etc. is detected.

However, the thus configured information processing device according to the related art detects approach by a person that just gets on and off a vehicle parked or stopped adjacently etc. (i.e. a person that is not a suspicious person), even if the information processing device is intended to detect approach by a suspicious person to the vehicle 10. That is, the user may be frequently notified of detection results when people frequently approach the vehicle 10.

Frequent notifications of events that are less urgent are troublesome for the user. Thus, the information processing device 100 according to the present embodiment selectively sends notifications to the user terminal 300 when the above events have occurred.

For example, the information processing device 100 transmits a notification to the user terminal 300 when the occurrence of an impact on the vehicle 10, an intrusion into the vehicle 10, etc. has been detected. When the notification is received, the user terminal 300 outputs a screen that indicates the occurrence of an event to be detected etc., video captured by the in-vehicle camera 400 and transmitted from the information processing device 100, etc. In addition, the information processing device 100 stores video captured by the in-vehicle camera 400 etc. in a storage unit (to be discussed later) of the information processing device 100, and transmits the video etc. to the server 200 at the same time.

When the occurrence of approach by a person to the vehicle 10 is detected, on the contrary, the information processing device 100 stores information that indicates the occurrence of a detected event, video captured by the in-vehicle camera 400, etc. in the storage unit of the information processing device 100 without transmitting a notification to the user terminal 300.

In this manner, the information processing device 100 determines whether to send a notification to the user terminal 300, based on the type of an event detected to have occurred in the vehicle 10. Consequently, it is possible to reduce the trouble of the user caused by frequent notifications sent to the user terminal 300.

Further, the information processing device 100 determines whether to save the video etc. only in a local storage device or to also transmit the video etc. to the server device, based on the type of an event detected to have occurred in the vehicle 10. Consequently, it is possible to save video of a relatively low importance only in a local device and to share important video with the server device.

Figure 2:
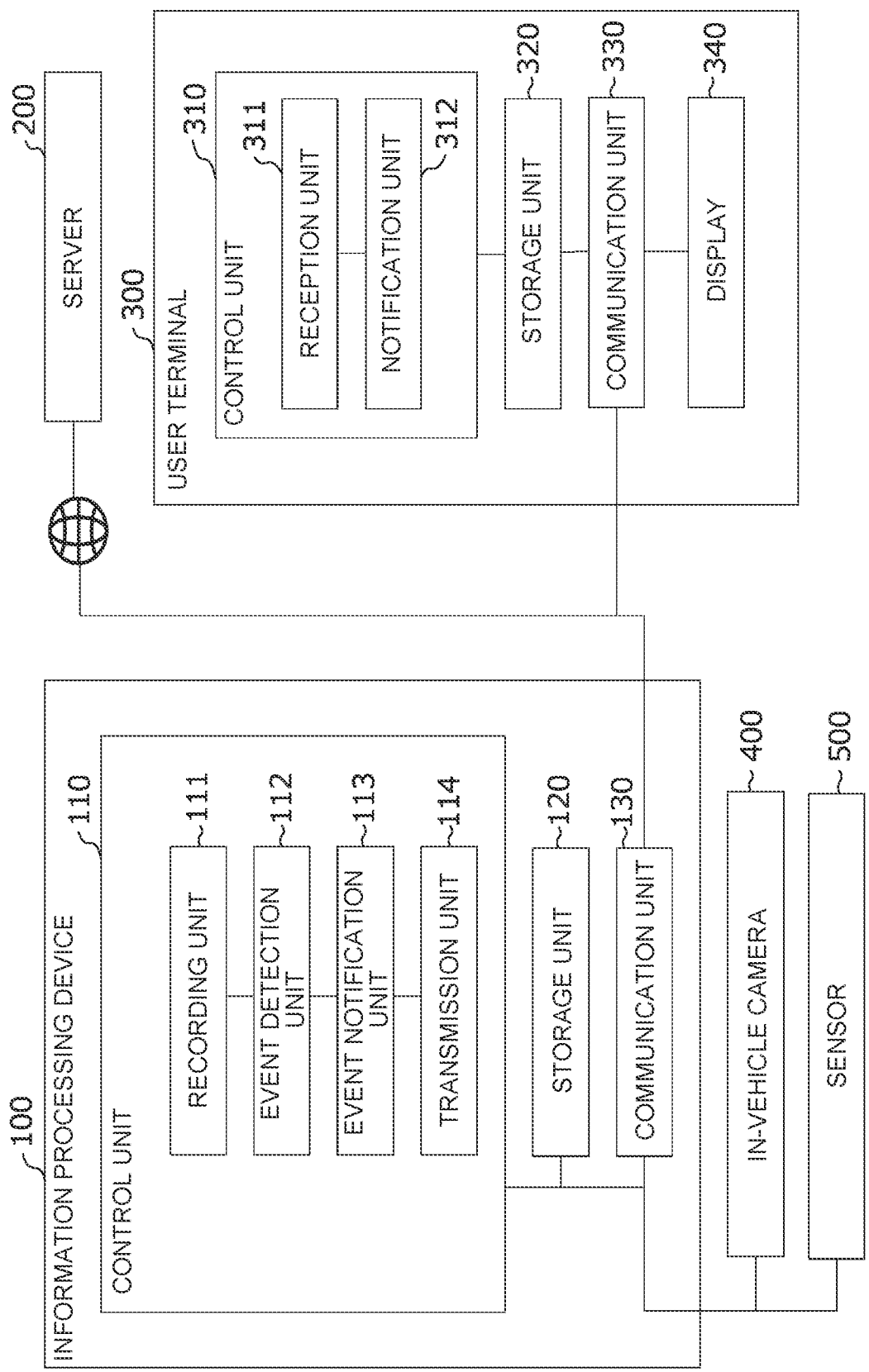
FIG. 2 is a diagram illustrating constituent elements included in a system according to the first embodiment.

Next, the constituent elements of the information processing device 100 will be described with reference to FIG. 2. FIG. 2 is a diagram illustrating constituent elements included in the system according to the present embodiment.

The information processing device 100 is an information processing device mounted on the vehicle 10 to detect the occurrence of a first event, a second event, etc. based on data transmitted from the in-vehicle camera 400 and the sensor 500 mounted on the vehicle 10. In the present embodiment, the first event is an event that occurs when an impact on the vehicle 10 is detected or when an intrusion into the vehicle 10 etc. is detected. The second event is an event that occurs when a person approaching the vehicle 10 is detected. In the present embodiment, when the above event has occurred, the information processing device 100 selectively sends a notification to the user terminal 300 and saves video obtained when the event has occurred in a predetermined device.

The information processing device 100 includes a control unit 110, a storage unit 120, and a communication unit 130. The information processing device 100 can communicate with the server 200, the user terminal 300, the in-vehicle camera 400, and the sensor 500 via the communication unit 130. The user terminal 300 includes a control unit 310, a storage unit 320, a communication unit 330, and a display 340.

Elements that constitute the system will be described in detail.

First, the control unit 110 will be described.

The control unit 110 is implemented by a processor such as a central processing unit (CPU) or a graphics processing unit (GPU) and a memory. The control unit 110 includes a recording unit 111, an event detection unit 112, an event notification unit 113, and a transmission unit 114 as functional modules. These functional modules may be implemented by the control unit 110 executing a program.

The recording unit 111 receives information that a first event or a second event has occurred from the event detection unit 112 to be discussed later. When a first event has occurred, the recording unit 111 records first video data in a predetermined storage device, the first video data being video data captured by the in-vehicle camera 400 of the vehicle 10 and obtained when the first event has occurred. The predetermined storage device includes both the storage unit 120 of the information processing device 100 and the server 200 that is external to the information processing device 100.

When a second event has occurred, the recording unit 111 records second video data in only the storage unit 120, the second video data being video data captured by the in-vehicle camera 400 and obtained when the second event has occurred.

When the in-vehicle camera 400 includes a plurality of cameras, the recording unit 111 may record video data captured by each of the cameras in the storage unit 120.

As described above, the recording unit 111 saves first video data in which the first event is recorded when the first event has occurred, and saves second video data in which the second event is recorded when the second event has occurred.

The first video data are saved in both the storage unit 120 and the server 200, and the second video data are stored in only the storage unit 120.

The event detection unit 112 detects whether a first event has occurred or whether a second event has occurred. Specifically, the event detection unit 112 acquires data from the in-vehicle camera 400 or the sensor 500 via the communication unit 130, and determines whether a first event has occurred or whether a second event has occurred based on the acquired data.

As discussed earlier, the first event is an event that occurs when an impact on the vehicle 10 is detected or when an intrusion into the vehicle 10 etc. is detected. Meanwhile, the second event is an event that occurs when a person approaching the vehicle 10 is detected.

The event detection unit 112 transmits the results of determinations to the recording unit 111 and the event notification unit 113.

The event notification unit 113 transmits first information that indicates the occurrence of a first event to the user terminal 300 when the event detection unit 112 detects that a first event has occurred. The event notification unit 113 does not transmit information that indicates the occurrence of a second event to the user terminal 300 when the event detection unit 112 detects that a second event has occurred.

The transmission unit 114 transmits video data captured by the in-vehicle camera 400 to the user terminal 300. Specifically, when a video transmission request (first request) from the user terminal 300 is received, the transmission unit 114 transmits video data captured by the in-vehicle camera 400 to the user terminal 300 in response to the first request. The transmission unit 114 may have a server function for providing video data to the user terminal 300.

Next, the constituent elements that constitute the information processing device 100 other than the control unit 110 will be described.

The storage unit 120 includes a main storage device such as a random access memory (RAM) and a read only memory (ROM) and an auxiliary storage device such as an erasable programmable ROM (EPROM), a hard disk drive, and a removable medium. The auxiliary storage device stores an operating system, various programs, various tables, etc. Various functions that match a predetermined purpose of the respective units of the control unit 110 can be implemented by executing the programs stored in the auxiliary storage device. However, some or all of the functions may be implemented by a hardware circuit such as an application specific integrated circuit (ASIC) and a field-programmable gate array (FPGA).

The storage unit 120 stores data etc. to be used or generated in a process performed by the control unit 110. The storage unit 120 may store data etc. to be used or generated in a process for various functions (e.g. a function of monitoring security, a remote operation function, etc.) of the vehicle 10 to execute a service.

The communication unit 130 is constituted of a communication circuit that performs wireless communication. The communication unit 130 may be a communication circuit that performs wireless communication using 4G, or may be a communication circuit that performs wireless communication using 5G, for example. Alternatively, the communication unit 130 may be a communication circuit that performs wireless communication using long term evolution (LTE), or may be a communication circuit that performs communication using Low Power Wide Area (LPWA). Alternatively, the communication unit 130 may include a wired communication circuit, and may communicate with the user terminal 300 etc. connected to the communication unit 130 through a wire, for example.

The communication unit 130 may include a hardware interface that provides access to an in-vehicle network of the vehicle 10.

Next, the devices included in the system other than the information processing device 100 will be described.

First, the server 200 will be described. The server 200 is a server device installed outside the vehicle 10 to perform wireless communication with the information processing device 100. The server 200 may be a server capable of storing and processing large-scale data. The server 200 is connected to the information processing device 100 via a wide area network such as the Internet. For example, the server 200 may be implemented as a cloud server.

Next, the user terminal 300 will be described. The user terminal 300 is a computer possessed by a user of the vehicle 10.

The control unit 310 of the user terminal 300 is implemented by a processor such as a CPU or a GPU and a memory, as with the control unit 110. The control unit 310 includes a reception unit 311 and a notification unit 312 as functional modules. These functional modules may be implemented by the control unit 310 executing a program.

The reception unit 311 receives first information indicating that a first event has occurred in the vehicle 10 from the information processing device 100 (event notification unit 113).

The notification unit 312 notifies the user of the occurrence of the first event via a predetermined interface when the reception unit 311 has received the first information. For example, the notification unit 312 may output information that indicates the occurrence of the first event to a display unit when the notification unit 312 determines that the first event has occurred. Alternatively, the notification unit 312 may output audio that indicates the occurrence of the first event from an output unit when the reception unit 311 has received the first information.

The display 340 is a display unit that indicates an image etc. The display 340 may be a touch panel display, or may be an organic electro-luminescence (EL) display or a liquid crystal display.

Next, the devices of the vehicle 10 will be described.

The in-vehicle camera 400 is a digital camera that includes an imaging element such as a complementary metal oxide semiconductor (CMOS) sensor, and is mounted on the vehicle 10. The in-vehicle camera 400 may be provided in a drive recorder etc. of the vehicle 10, or may be a digital camera installed independently of a drive recorder, for example. The in-vehicle camera 400 may be constituted to include a plurality of cameras. The cameras may capture the front side, rear side, lateral sides, and interior of the vehicle 10, for example.

The sensor 500 is a sensor mounted on the vehicle 10. Specific examples of the sensor 500 include an ultrasonic sensor, an inclination sensor, etc. The sensor may also include an acceleration sensor, a gyro sensor, a global positioning system (GPS) sensor, a millimeter wave radar, a three-dimensional light detection and ranging (3D-LiDAR), etc. The event detection unit 112 of the information processing device 100 may acquire sensor data detected by the sensor 500.

The configuration illustrated in FIG. 2 is exemplary, and all or some of the illustrated functions may be executed using an exclusively designed circuit. The program may be stored or executed by a combination of a main storage device and an auxiliary storage device other than that illustrated in the drawing.

Figure 3:
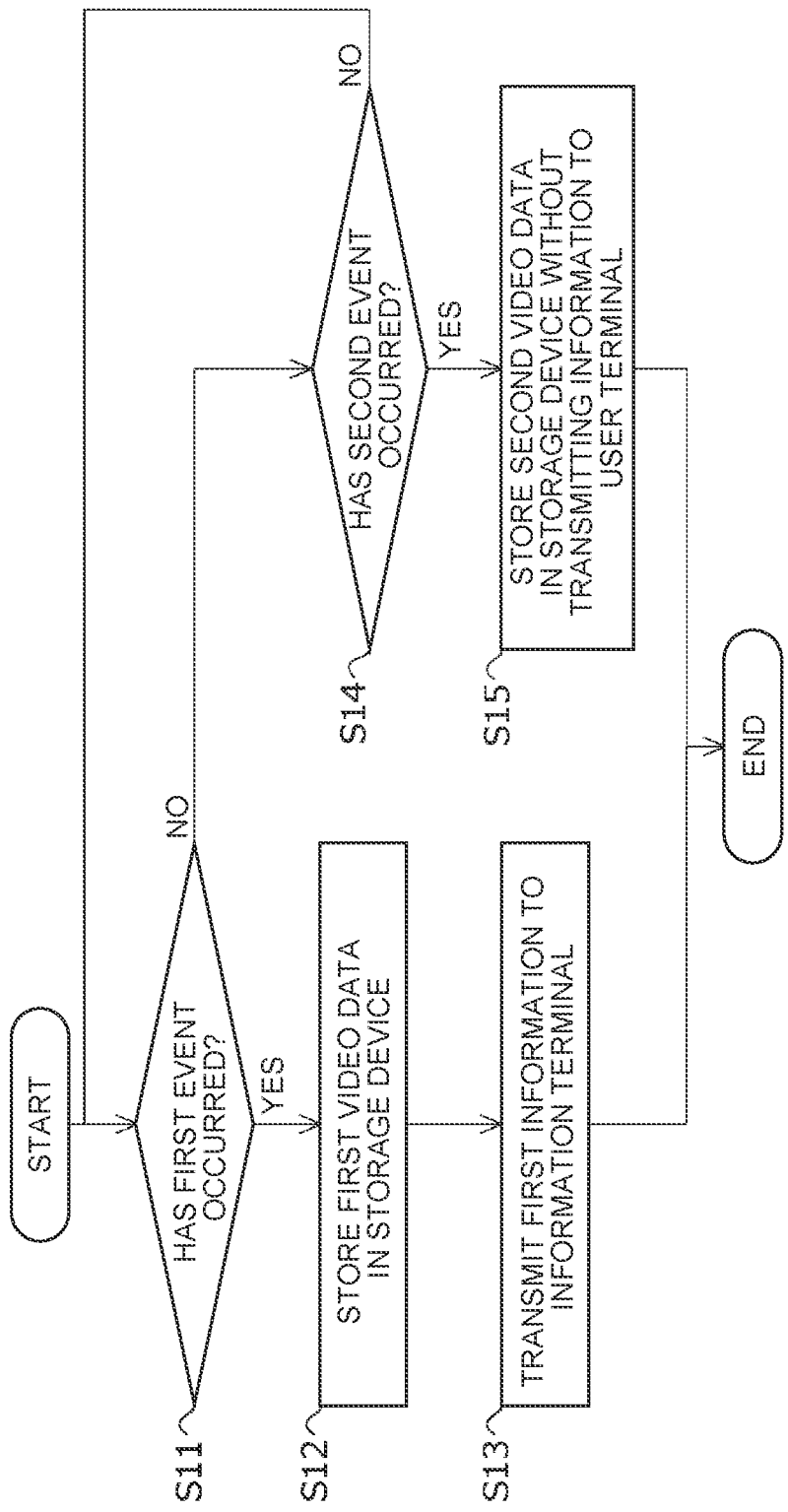
FIG. 3 is a flowchart of a process executed by the information processing device.

Next, a specific content of a process performed by the information processing device 100 will be described. FIG. 3 is a flowchart of a process executed by the control unit 110. The illustrated process is repeatedly executed while a travel system of the vehicle 10 is stationary and the information processing device 100 is monitoring the vehicle 10.

First, in step S11, the event detection unit 112 determines whether a first event has occurred in the vehicle 10. Specifically, the event detection unit 112 determines whether a first event such as an impact on the vehicle 10 or an intrusion into the vehicle 10 has occurred, based on data acquired from the in-vehicle camera 400 or the sensor 500. A positive determination is made in the present step when the event detection unit 112 determines that a first event has occurred in the vehicle 10.

When a positive determination is made in the present step, the process transitions to step S12.

When a negative determination is made in the present step, the process transitions to step S14.

When the process transitions to step S12, the recording unit 111 stores the first video data in a predetermined storage device. Specifically, the recording unit 111 stores the first video data in both the storage unit 120 of the information processing device 100 and the server 200 that is external to the information processing device 100. When the recording unit 111 stores the first video data in the server 200, the recording unit 111 may upload the first video data to the server 200 by connecting to a wide area network such as the Internet via the communication unit 130.

Next, in step S13, the event notification unit 113 transmits first information that indicates the occurrence of the first event to the user terminal 300. That is, the event notification unit 113 notifies the user terminal 300 that an event such as an impact on the vehicle 10 or an intrusion into the vehicle 10 has occurred.

When the process transitions to step S14, the event detection unit 112 determines whether a second event has occurred in the vehicle 10. Specifically, the event detection unit 112 determines whether a second event that is approach by a person to the vehicle 10 has occurred, based on data acquired from the in-vehicle camera 400 or the sensor 500. A positive determination is made in the present step when the event detection unit 112 determines that a second event has occurred in the vehicle 10.

When a positive determination is made in the present step, the process transitions to step S15.

When a negative determination is made in the present step, the process transitions to step S11. Then, the above process is repeated.

Step S14 may be performed before step S11. In that case, the process transitions to step S15 when a positive determination is made in step S14, and the process transitions to step S11 when a negative determination is made in step S14. Then, the process transitions to step S12 when a positive determination is made in step S11, and the process transitions to step S14 when a negative determination is made in step S11.

When the process transitions to step S15, the recording unit 111 stores second video data in the predetermined storage device without the event notification unit 113 transmitting information that indicates the occurrence of the second event to the user terminal 300. At this time, the recording unit 111 stores the second video data in only the storage unit 120 of the information processing device 100, and does not store the second video data in the server 200 that is external to the information processing device 100.

Figure 4:
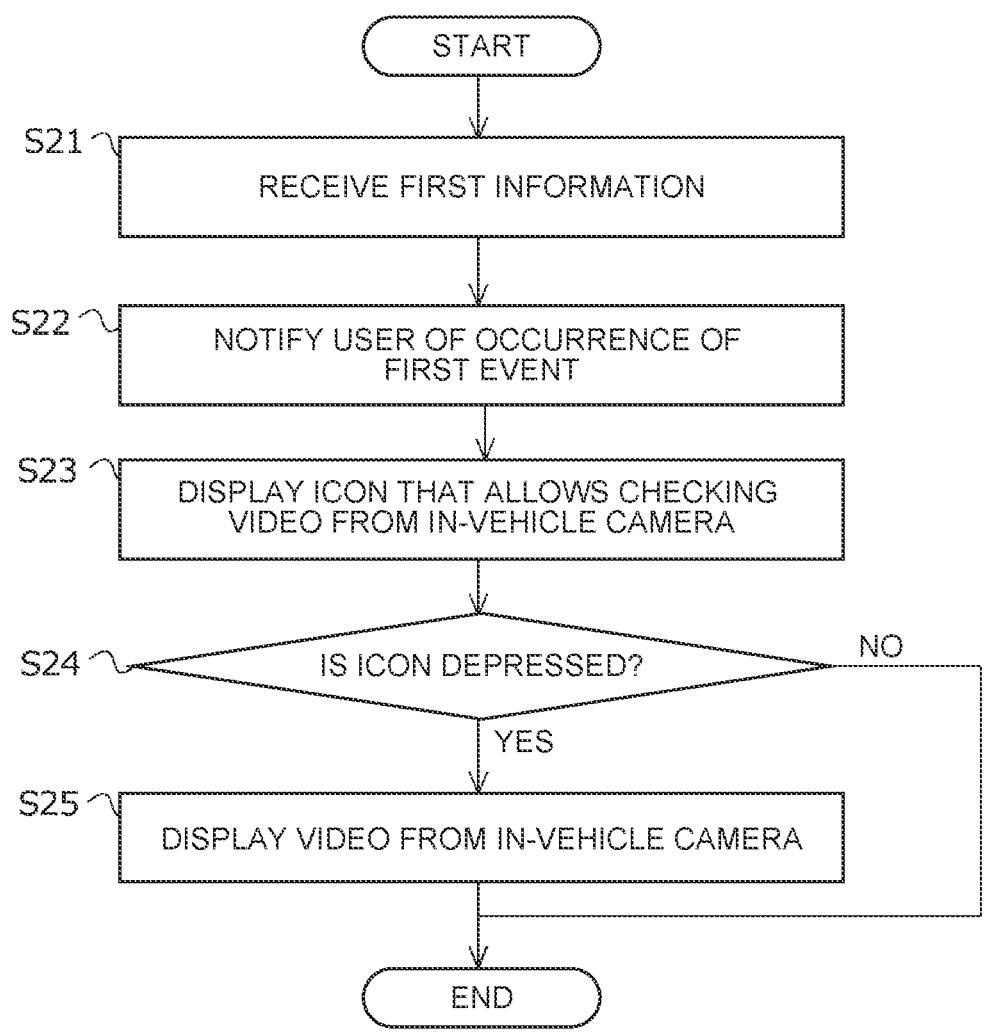
FIG. 4 is a flowchart of a process executed by a user terminal.

Next, a specific content of a process performed by the user terminal 300 will be described. FIG. 4 is a flowchart of a process executed by the user terminal 300 when the user terminal 300 notifies the user. The illustrated process is executed when the first information is transmitted from the information processing device 100 to the user terminal 300.

First, in step S21, the reception unit 311 receives first information transmitted from the information processing device 100.

Next, in step S22, the notification unit 312 notifies the user that a first event has occurred. Specifically, the notification unit 312 outputs information indicating that a first event has occurred to a display unit. The notification unit 312 may output audio indicating that a first event has occurred, or may output vibration indicating that a first event has occurred.

Next, in step S23, the notification unit 312 of the user terminal 300 outputs an interface that allows checking video from the in-vehicle camera 400 on a display unit. In the present step, the user terminal 300 outputs an icon capable of receiving a depressing operation by the user to a display etc. of the user terminal 300. The icon is an example of an "interface that allows checking video obtained by an in-vehicle camera".

Next, in step S24, the notification unit 312 determines whether the icon for checking video from the in-vehicle camera 400 has been depressed. Specifically, the notification unit 312 may determine whether a signal generated when the icon is depressed has been detected.

A positive determination is made in the present step when the notification unit 312 determines that the icon for checking video from the in-vehicle camera 400 has been depressed.

When a positive determination is made in the present step, the process transitions to step S25.

When a negative determination is made in the present step, the process is ended.

When the process transitions to step S25, the notification unit 312 displays video captured by the in-vehicle camera 400 on the display 340.

In the present step, the notification unit 312 outputs a user interface that allows logging in to a server provided by the information processing device 100 (transmission unit 114), and allows logging in to the server based on input information.

When the login is completed, the notification unit 312 requests the information processing device 100 (transmission unit 114) to transmit video. When the request is received, the transmission unit 114 of the information processing device 100 reads video obtained when the first event has occurred from the storage unit 120, and transmits the video to the user terminal 300. Then, the notification unit 312 outputs the video transmitted by the transmission unit 114.

The notification unit 312 displays the video captured by the in-vehicle camera 400 and transmitted from the information processing device 100 on a screen etc.

The video transmitted from the information processing device 100 may be video obtained when the first event has occurred (i.e. video recorded in the storage unit 120), or may be video acquired in real time. The video may be a still image, or may be a movie.

While an example in which the information processing device 100 reads video from the storage unit 120 and transmits the video to the user terminal 300 is mentioned here, the video to be transmitted to the user terminal 300 may be video stored in the server 200. In this case, a request may be transmitted from the user terminal 300 to the server 200, and the server 200 may transmit video to the user terminal 300 based on the request. Alternatively, a request may be transmitted from the user terminal 300 to the information processing device 100, the information processing device 100 having received the request may instruct the server 200 to transmit video, and accordingly the server 200 may transmit video to the user terminal 300.

In this manner, the user terminal 300 displays an icon that receives an instruction to display video captured by the in-vehicle camera 400 on a display unit such as a display of the user terminal 300, and outputs the video on a display unit such as a display when the icon is depressed. That is, the user terminal 300 outputs a user interface that allows the user to check video captured by the in-vehicle camera 400 when information indicating that a first event has occurred is received.

Next, the user interface output by the user terminal 300 and described in relation to FIG. 4 will be described. FIGS. 5A, 5B, 5C, and 5D each illustrate an example of a screen output by the user terminal 300. The illustrated screens are output when an icon that allows logging in to the server function of the transmission unit 114 of the information processing device 100 and when the user terminal 300 is notified of the first information.

As illustrated in FIG. 5A, a display screen 1000 includes, as displayed thereon, a user identifier (ID) input field 1110 and a password input field 1120 that allow inputting account information on the user, and a log-in button 1130 that allows logging in to a server using the input account information.

When the log-in button 1130 is depressed, a real time button 1210 that allows checking video captured by the in-vehicle camera 400 in real time and a watching history button 1220 that allows checking video captured by the in-vehicle camera 400 in the past are displayed as illustrated in FIG. 5B. For example, the user depresses the real time button 1210 when the user desires to check in real time video presently being captured by the in-vehicle camera 400.

When the real time button 1210 is depressed, a screen that allows selecting one of a plurality of in-vehicle cameras mounted on a vehicle A is displayed as illustrated in FIG. 5C. For example, a front camera button 1310, a rear camera button 1320, a vehicle interior camera button 1330, a 360°/BGM camera button 1340, etc. are displayed. When a single in-vehicle camera is mounted on the vehicle A, only one button that allows selecting the in-vehicle camera is displayed.

The user selects one in-vehicle camera for which the user desires to check video, and depresses a corresponding icon. For example, when the user depresses the front camera button 1310 when the user desires to check video from a front camera.

When the front camera button 1310 is depressed, real-time video 1410 is displayed on the display screen 1000 as illustrated in FIG. 5D. In this case, the real-time video 1410 is video captured by the front camera mounted on the vehicle A.

When the watching history button 1220 illustrated in FIG. 5B is depressed, the screen is switched to an interface that provides video captured by an in-vehicle camera in advance and stored in the storage unit 120 or the server 200. The user can select and view video captured in advance using the interface.

As described above, the information processing device according to the present embodiment switches whether to transmit a notification to the user terminal 300 between when a first event has occurred and when a second event has occurred. Specifically, the control unit 110 transmits information to the user terminal 300 when a first event has occurred, and does not transmit information to the user terminal 300 when a second event has occurred. With such a configuration, the information processing device 100 can reduce unnecessary notifications sent to the user terminal 300 while the information processing device 100 is monitoring the vehicle 10.

Further, the control unit 110 records video data in both the storage unit 120 and the server 200 when a first event has occurred, and records video data in only the storage unit 120 when a second event has occurred. With such a configuration, it is possible to appropriately select where to save the video data according to the degree of importance of the video data.

Modification of First Embodiment

In the present embodiment, the information processing device 100 transmits first information to the user terminal 300 only when a first event has occurred. In the present modification, on the contrary, the information processing device 100 transmits information for notification to the user terminal 300 irrespective of the type of the event, and it is determined on the user terminal 300 side whether a notification can be sent to the user.

As described in relation to the first embodiment, when a first event has occurred, the information processing device 100 (event notification unit 113) transmits first information to the user terminal 300. In the present modification, on the other hand, the information processing device 100 (event notification unit 113) transmits second information to the user terminal 300 even when a second event has occurred. The second information is information indicating that a second event has occurred.

That is, in the present modification, the information processing device 100 (event notification unit 113) notifies the user terminal 300 that an event has occurred irrespective of the type of the event.

In the present modification, the notification unit 312 described in relation to FIG. 1 determines whether a first event has occurred in the vehicle 10 based on first information or second information received by the reception unit 311. Specifically, the notification unit 312 determines that a first event has occurred in the vehicle 10 when the reception unit 311 receives first information, and determines that a second event has occurred in the vehicle 10 when the reception unit 311 receives second information.

As discussed earlier, a notification should not be instantly sent to the user for the second event.

Thus, in the present modification, the user terminal 300 switches whether to notify the user between when first information is received and when second information is received. Specifically, the user terminal 300 notifies the user of the occurrence of a first event via a predetermined interface when first information is received, and does not notify the user when second information is received.

In this manner, a process of switching whether to make a notification according to the type of the event may be executed on the user terminal 300 side.

Second Embodiment

In the first embodiment, the information processing device 100 uploads video obtained when a first event has occurred (e.g. an impact is detected) to the server 200 when a first event is detected. In other words, only video obtained when a first event is detected is uploaded to the server 200.

When a second event is detected (e.g. a person is detected) before a first event is detected (e.g. an impact is detected), on the other hand, the information processing device 100 preferably uploads video retroactively in order to allow checking the two events.

In the second embodiment, in order to address this situation, video (second video data) corresponding to a second event is uploaded to the server 200 in addition to video corresponding to a first event when the first event occurs within a predetermined time since the second event occurs.

In the first embodiment, the recording unit 111 records first video data in a predetermined storage device (storage unit 120 and server 200) when the event detection unit 112 determines that a first event has occurred.

In the second embodiment, on the contrary, the recording unit 111 reads second video data recorded when a second event has occurred from the storage unit 120 and transmits the second video data to the server 200 when the event detection unit 112 determines that a first event has occurred within a predetermined time since the occurrence of the second event. That is, both first video data and second video data are transmitted to the server 200 when a first event has occurred within a predetermined time since the occurrence of a second event.

By the recording unit 111 performing the above operation, the recording unit 111 can retroactively save video data obtained when a second event has occurred in the server 200, in addition to video data obtained when a first event has occurred.

In the first embodiment, the second video data are recorded in only the storage unit 120, and therefore the work of connecting a device, moving a storage medium, etc. is required in order to read the data. In the second embodiment, on the other hand, the second video data considered to be highly important can be recorded in the server 200. Consequently, it is possible to easily execute a service such as providing recorded video to a user.

In the second embodiment, the event detection unit 112 determines whether a first event has occurred within a predetermined time since the occurrence of a second event. Therefore, the event detection unit 112 may determine the times of occurrence of a first event and a second event to measure an elapsed time between the times of occurrence of the first event and the second event. The determination results are transmitted to the recording unit 111 and the event notification unit 113.

In addition, the event notification unit 113 may transmit both first information and second information to the user terminal 300 when the event detection unit 112 determines that a first event has occurred within a predetermined time since the occurrence of a second event. That is, the user terminal 300 may be notified that a first event has occurred subsequent to a second event.

Figure 6:
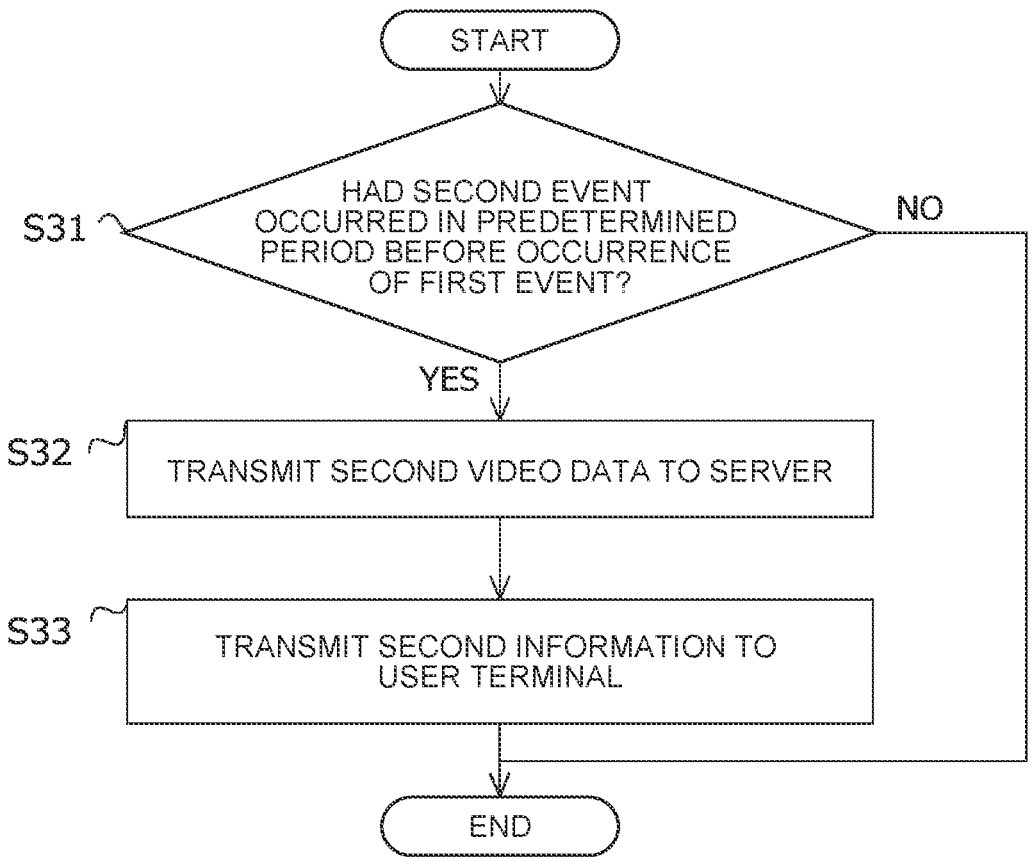
FIG. 6 is a flowchart of a process executed by the information processing device.

FIG. 6 is a flowchart of a process executed by the control unit 110 according to the second embodiment. The illustrated process is executed after step S13 in FIG. 3 is executed.

In step S31, the event detection unit 112 determines whether a second event had occurred in a predetermined period before the occurrence of the first event determined in step S11. Specifically, the event detection unit 112 determines the times of occurrence of the first event (that has occurred currently) and the second event (that occurred in the past), and measures an elapsed time between the times of occurrence of the first event and the second event. A positive determination is made in the present step when the event detection unit 112 determines that the first event has occurred within the predetermined time since the occurrence of the second event.

When a positive determination is made in the present step, the process transitions to step S32.

When a negative determination is made in the present step, the process is ended.

When the process transitions to step S32, the recording unit 111 transmits (copies) the second video data recorded when the second event occurred to the server 200. Consequently, both the first video data transmitted in step S12 and the second video data transmitted in the present step are stored in the server 200.

Next, in step S33, the event notification unit 113 transmits second information to the user terminal 300. That is, the event notification unit 113 transmits a notification indicating that a second event has occurred in the vehicle 10 to the user terminal 300.

Consequently, the user terminal 300 receives both the first information transmitted in step S13 and the second information transmitted in the present step.

The user terminal 300 may further output an interface that allows checking second video data in addition to an interface that allows checking first video data when first information and second information are received. Consequently, it is possible to retroactively check video obtained when the second event occurred.

Third Embodiment

In the first embodiment, the user is notified only when a first event has occurred (e.g. an impact is detected), and not notified when a second event has occurred. Meanwhile, the user is preferably notified that a second event is continuously occurring when the length of a period for which the second event is continuously occurring becomes a predetermined threshold or more.

In the third embodiment, in order to address this situation, the user terminal 300 is notified of second information indicating that a second event is occurring when the length of a period for which the second event is continuously occurring becomes a predetermined threshold or more.

In the present embodiment, when a second event is detected, the event detection unit 112 determines whether the duration of the second event has become a predetermined threshold or more. Here, the language "the second event is continuously occurring" means that a second event occurs again within a predetermined time after a second event has occurred. The language "duration of the second event" means the time (period) for which it can be estimated that a second event is continuously occurring. That is, the event detection unit 112 monitors whether a second event has occurred again within a predetermined time after a second event occurred. Then, when a second event has occurred again within a predetermined time, the event detection unit 112 may measure the time for which a second event is repeatedly occurring within the predetermined time.

When the event detection unit 112 determines that the duration of the second event has become a predetermined threshold or more, the event notification unit 113 transmits second information to the user terminal 300.

Figure 7:
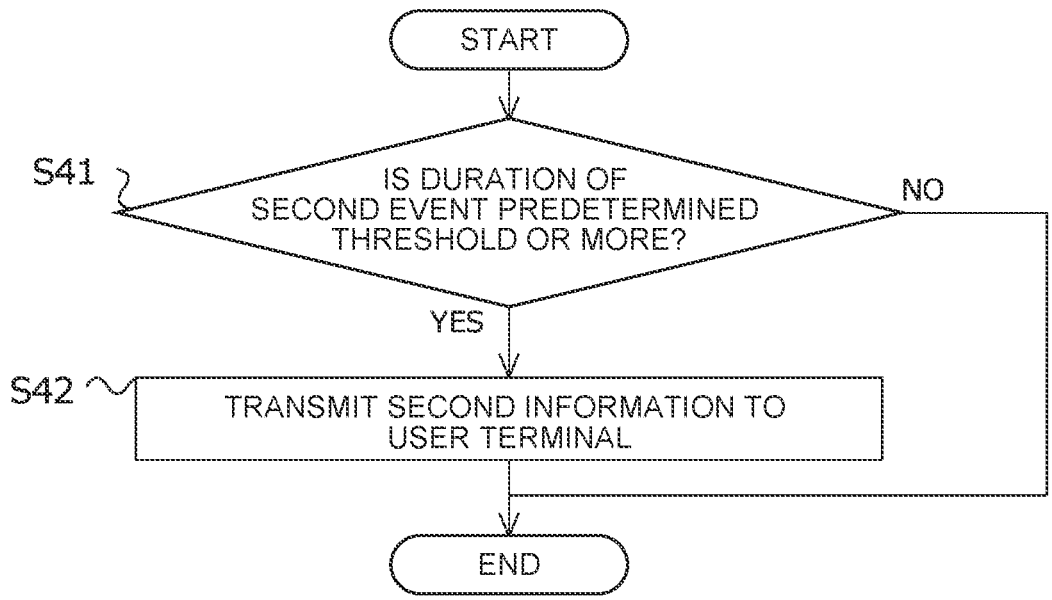
FIG. 7 is a flowchart of a process executed by the information processing device.

FIG. 7 is a flowchart of a process executed by the control unit 110 according to the third embodiment. The illustrated process is executed after step S15 in FIG. 3 is executed.

In step S41, the event detection unit 112 determines whether the duration of the second event determined in step S14 has become a predetermined threshold or more. In the present step, the event detection unit 112 determines whether a second event has occurred again within a predetermined time after a second event occurred and the duration of the second event has become a predetermined threshold or more.

A positive determination is made in the present step when the event detection unit 112 determines that the duration of the second event has become a predetermined threshold or more.

When a positive determination is made in the present step, the process transitions to step S42.

When a negative determination is made in the present step, the process is ended.

When the process transitions to step S42, the event notification unit 113 transmits second information to the user terminal 300. That is, the event notification unit 113 transmits a notification indicating that a second event has occurred in the vehicle 10 to the user terminal 300.

While the event notification unit 113 transmits second information, that is, information simply indicating that a person has been detected, to the user terminal 300 in the present example, the event notification unit 113 may instead transmit information (referred to as "third information") indicating that a person is continuously detected to the user terminal 300. The user terminal 300 having received the third information may notify the user that a person is continuously detected from a predetermined time ago, for example.

The user terminal 300 may display an icon that allows checking video from the in-vehicle camera 400 when the second information is received, and display an interface that allows checking second video data on the display 340.

Fourth Embodiment

In the first embodiment, the user terminal 300 outputs an interface that allows checking video from a camera in response to receiving first information. On the other hand, the user terminal 300 may request the information processing device 100 to transmit video from a camera etc. at a desired timing.

In a fourth embodiment, the user terminal 300 transmits a request to an information processing device 100A at a desired timing, and the information processing device 100A executes a process corresponding to the request upon receiving the request.

Figure 8:
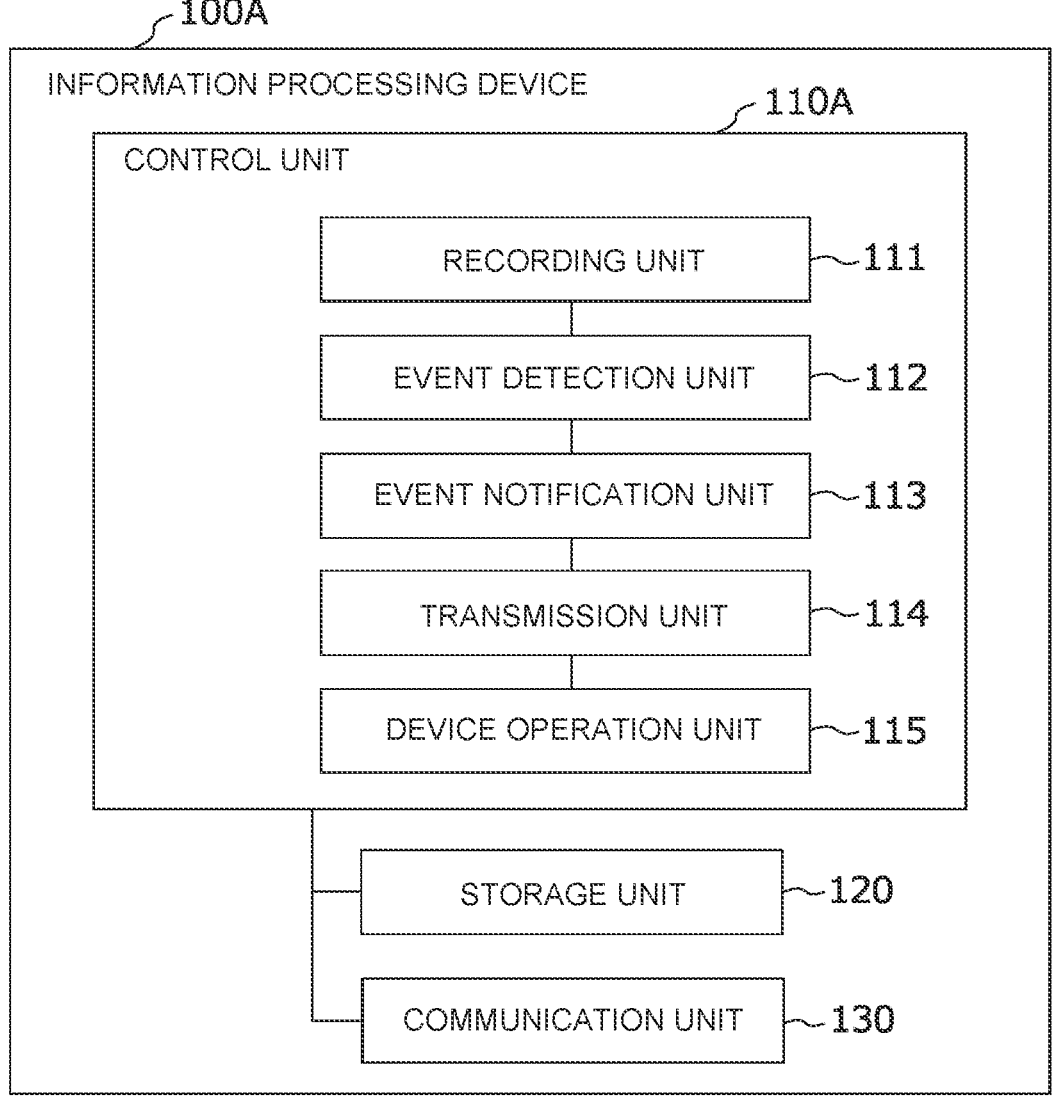
FIG. 8 is a diagram illustrating constituent elements of an information processing device according to a fourth embodiment.

FIG. 8 is a diagram illustrating constituent elements of the information processing device 100A according to the fourth embodiment. In the fourth embodiment, a control unit 110A of the information processing device 100A includes a device operation unit 115 in addition to the constituent elements described in relation to the first embodiment. The device operation unit 115 is a functional module that activates any of a plurality of devices of the vehicle 10 in response to a request from the user terminal 300. The device operation unit 115 may have a server function as with the transmission unit 114. The user terminal 300 can request activation of the device discussed earlier by logging in to a server that operates on the device operation unit 115.

In the fourth embodiment, the transmission unit 114 receives a first request from the user terminal 300. Here, the first request is information with which the user terminal 300 instructs the information processing device 100A to transmit video captured by the in-vehicle camera 400 to the user terminal 300, for example. The first request may include the date and time when the video was recorded and information that specifies a camera. When the first request is received, the transmission unit 114 reads corresponding video from the storage unit 120, or acquires real-time video from the in-vehicle camera 400, and transmits the video to the user terminal 300.

In the fourth embodiment, in addition, the device operation unit 115 receives a second request. The second request is information with which the user terminal 300 instructs the information processing device 100A to activate any of a plurality of devices, including devices of different types, of the vehicle 10, for example.

Examples of the devices include a wiper, a car horn, headlights, etc.

When the second request is received, the device operation unit 115 activates any of the devices, including devices of different types, of the vehicle 10. Here, examples of the devices of the vehicle 10 include a wiper, a car horn, headlights, etc.

Figure 9:
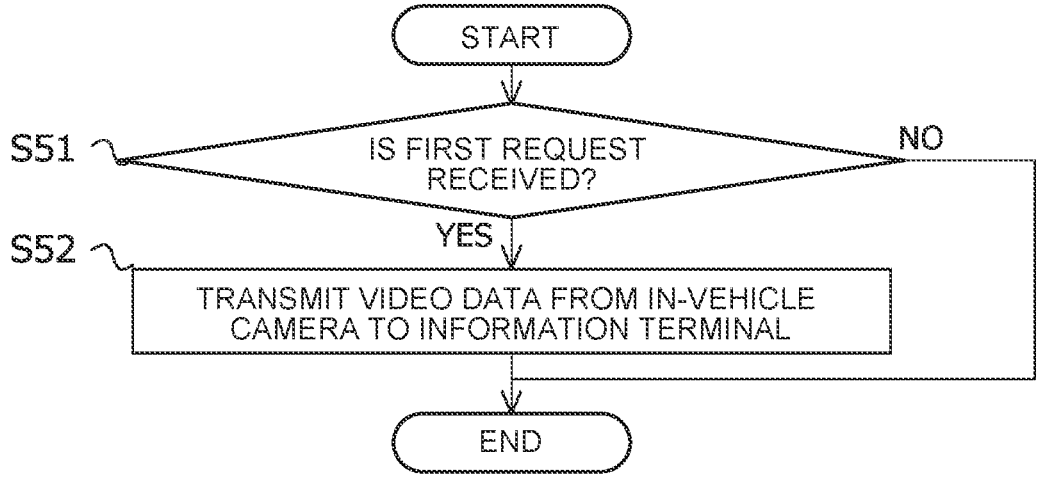
FIG. 9 is a flowchart of a process executed by the information processing device according to the fourth embodiment.

FIG. 9 is a flowchart of a process executed by the control unit 110A when the information processing device 100A receives a first request from the user terminal 300. Here, the first request is information with which the user terminal 300 instructs the information processing device 100A to transmit video captured by the in-vehicle camera 400 to the user terminal 300, as discussed above.

First, in step S51, the transmission unit 114 determines whether a first request has been received from the user terminal 300. In the present step, the user terminal 300 outputs a log-in screen that allows logging in to a server provided by the information processing device 100A (transmission unit 114) in response to an operation by the user. After a log-in operation by the user, the user terminal 300 generates a first request in response to a predetermined operation by the user, and transmits the first request to the information processing device 100A (transmission unit 114).

A positive determination is made in the present step when the transmission unit 114 determines that a first request has been received.

When a positive determination is made in the present step, the process transitions to step S52.

When a negative determination is made in the present step, the process is ended.

When the process transitions to step S52, the transmission unit 114 transmits video data captured by the in-vehicle camera 400 to the user terminal 300. The transmission unit 114 may transmit video data stored in the storage unit 120 in advance, or may instruct the server 200 to transmit video data stored in the server 200 to the user terminal 300. Alternatively, the transmission unit 114 may transmit real-time video captured by the in-vehicle camera 400 to the user terminal 300 by streaming.

Figure 10:
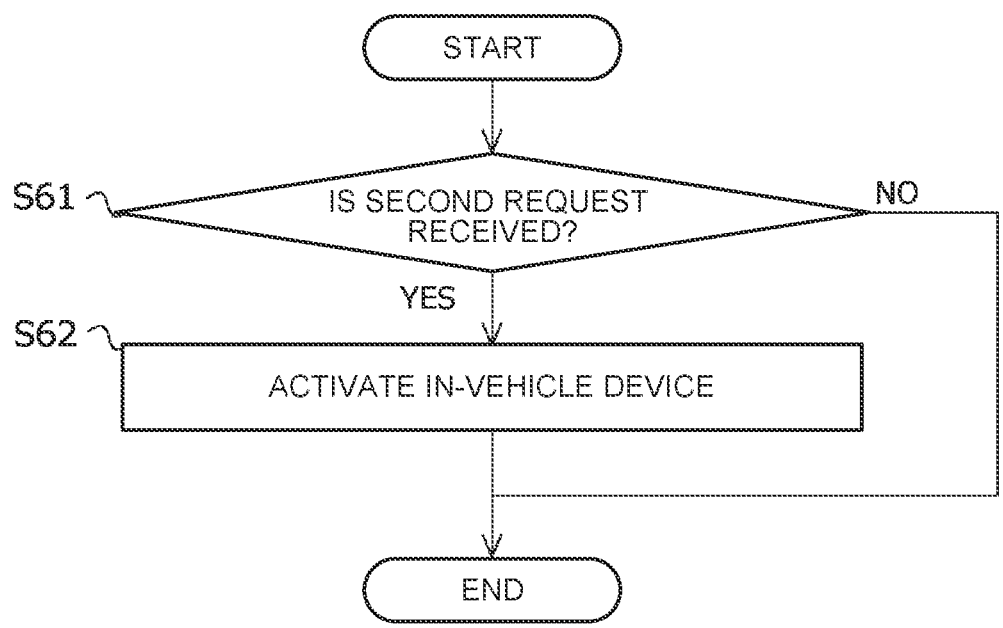
FIG. 10 is a flowchart of a process executed by the information processing device according to the fourth embodiment.

FIG. 10 is a flowchart of a process executed by the control unit 110A when the information processing device 100A receives a second request. Here, the second request is information with which the user terminal 300 instructs the information processing device 100A to activate any of a plurality of devices, including devices of different types, of the vehicle 10, as discussed above.

First, in step S61, the device operation unit 115 determines whether a second request has been received from the user terminal 300. In the present step, the user terminal 300 outputs a log-in screen that allows logging in to a server provided by the information processing device 100A (device operation unit 115) in response to an operation by the user. After a log-in operation by the user, the user terminal 300 generates a second request in response to a predetermined operation by the user, and transmits the second request to the information processing device 100A (device operation unit 115). The second request may include information for specifying the device to be activated, operation parameters, etc.

A positive determination is made in the present step when the device operation unit 115 determines that a second request has been received.

When a positive determination is made in the present step, the process transitions to step S62.

When a negative determination is made in the present step, the process is ended.

When the process transitions to step S62, the device operation unit 115 activates a device specified according to the second request, among the devices of the vehicle 10. The device operation unit 115 may activate one of the devices of the vehicle 10, or may activate a plurality of the devices simultaneously or sequentially.

Specifically, the device operation unit 115 may blow the car horn of the vehicle 10, and may actuate the wiper of the vehicle 10, for example. The device operation unit 115 may also turn on the headlights of the vehicle 10. The devices of the vehicle 10 discussed here may be any device that can be used to inform a person that is present around the vehicle 10 of the occurrence of an emergency or to warn a person that attempts to steal the vehicle 10, a person that attempts to intrude into the vehicle 10, etc.

Modifications

The processes described as being performed by a single device may be executed in a distributed manner by a plurality of devices. Alternatively, the processes described as being performed by different devices may be executed by a single device. In a computer system, the hardware configuration (server configuration) that implements functions can be changed flexibly.

The present disclosure can also be implemented by supplying a computer with a computer program that implements the functions described in relation to the above embodiments and causing one or more processors of the computer to read and execute the program. Such a computer program may be provided to the computer through a non-transitory computer-readable storage medium that is connectable to a system bus of the computer, or may be provided to the computer via a network. Examples of the non-transitory computer-readable storage medium include any type of disk such as a magnetic disk (floppy (registered trademark) disk, hard disk drive (HDD), etc.) and an optical disk (Compact Disc ROM (CD-ROM), Digital Versatile Disc (DVD), Blu-ray Disc, etc.), a read only memory (ROM), a random access memory (RAM), an erasable programmable ROM (EPROM), an electrically erasable programmable ROM (EEPROM), a magnetic card, a flash memory, an optical card, and any type of medium that is suitable for storing electronic instructions.

What is claimed is:

1. An information processing device mounted on a vehicle, comprising a control unit configured to,
   when a travel system of the vehicle is not activated,
      record first video data in a predetermined storage device when a first event has occurred in the vehicle, the first video data being video data captured by an in-vehicle camera of the vehicle and obtained when the first event has occurred, and transmit first information that indicates occurrence of the first event to a user terminal possessed by a user, and
      record second video data in the storage device when a second event of a different type from the first event has occurred without transmitting information that indicates occurrence of the second event to the user terminal, the second video data being video data captured by the in-vehicle camera and obtained when the second event has occurred.

2. The information processing device according to claim 1, wherein the control unit is configured to:
   record the first video data in a first storage device of the information processing device and an external server device as the predetermined storage device when the first event has occurred in the vehicle; and
   record the second video data in the first storage device as the predetermined storage device when the second event has occurred in the vehicle.

3. The information processing device according to claim 2, wherein the control unit is configured to, when the travel system of the vehicle is not activated, copy the second video data recorded in the first storage device and obtained when the second event has occurred to the external server device when the first event has occurred within a predetermined time since the occurrence of the second event.

4. The information processing device according to claim 3, wherein the control unit is configured to:
   determine times of the occurrence of the first event and the second event; and
   measure an elapsed time between the times of the occurrence of the first event and the second event.

5. The information processing device according to claim 1, wherein the control unit is configured to, when the travel system of the vehicle is not activated, transmit second information that indicates the occurrence of the second event to the user terminal when a length of a period for which the second event is continuously occurring becomes a predetermined threshold or more.

6. The information processing device according to claim 5, wherein the control unit is configured to measure a length of a period for which the second event is repeatedly occurring at predetermined intervals or less as the length of the period for which the second event is continuously occurring.

7. The information processing device according to claim 1, wherein the control unit is configured to transmit video data captured by the in-vehicle camera to the user terminal in response to a first request when the first request is received from the user terminal.

8. The information processing device according to claim 7, wherein the control unit is configured to transmit the video data to the user terminal by streaming in response to the first request.

9. The information processing device according to claim 1, wherein the control unit is configured to activate any of a plurality of devices, including devices of different types, of the vehicle when a second request is received from the user terminal.

10. The information processing device according to claim 9, wherein the devices include at least one of a wiper, a car horn, and headlights.

11. The information processing device according to claim 1, wherein the control unit is configured to determine whether the first event has occurred in the vehicle based on sensor data acquired from a sensor mounted on the vehicle.

12. The information processing device according to claim 11, wherein the control unit is configured to determine that an impact on the vehicle or an intrusion into the vehicle has been detected as the first event.

13. The information processing device according to claim 1, wherein the control unit is configured to determine whether the second event has occurred in the vehicle based on sensor data acquired from a sensor mounted on the vehicle.

14. The information processing device according to claim 13, wherein the control unit is configured to determine that a person approaching the vehicle has been detected as the second event.

15. A user terminal possessed by a user, comprising a control unit configured to:
when a travel system of a vehicle is not activated, receive information indicating that a first event or a second event of a different type from the first event has occurred in the vehicle; and
notify the user of occurrence of the first event via a predetermined interface when the information indicates that the first event has occurred in the vehicle.

16. The user terminal according to claim 15, further comprising a display unit that displays an image, wherein the control unit is configured to output information indicating that the first event has occurred via the display unit.

17. The user terminal according to claim 15, wherein the control unit is configured to output an interface that allows checking video obtained by an in-vehicle camera of the vehicle to a display unit when third information indicating that the second event is continuously occurring is received.

18. A non-transitory storage medium storing instructions that are executable by one or more processors and that cause the one or more processors to execute functions comprising:
when a travel system of a vehicle is not activated, receiving information indicating that a first event or a second event of a different type from the first event has occurred in the vehicle; and
notifying a user of occurrence of the first event via a predetermined interface when the information indicates that the first event has occurred in the vehicle.

19. An information processing method executed by an information processing device mounted on a vehicle, comprising:
when a travel system of the vehicle is not activated,
recording first video data in a predetermined storage device when a first event has occurred in the vehicle, the first video data being video data captured by an in-vehicle camera of the vehicle and obtained when the first event has occurred, and transmitting first information that indicates occurrence of the first event to a user terminal possessed by a user; and
recording second video data in the storage device when a second event of a different type from the first event has occurred without transmitting information that indicates occurrence of the second event to the user terminal, the second video data being video data captured by the in-vehicle camera and obtained when the second event has occurred.

* * * * *